US011358721B2

(12) United States Patent
Lange et al.

(10) Patent No.: US 11,358,721 B2
(45) Date of Patent: Jun. 14, 2022

(54) FORWARD INTERIOR SPACE ARRANGEMENT FOR AN AIRCRAFT

(71) Applicant: AIRBUS OPERATIONS GMBH, Hamburg (DE)

(72) Inventors: Roland Lange, Hamburg (DE); Andreas Heidtmann, Hamburg (DE)

(73) Assignee: Airbus Operations GmbH

( * ) Notice: Subject to any disclaimer, the term of this patent is extended or adjusted under 35 U.S.C. 154(b) by 682 days.

(21) Appl. No.: 15/878,019

(22) Filed: Jan. 23, 2018

(65) Prior Publication Data
US 2018/0208316 A1   Jul. 26, 2018

(30) Foreign Application Priority Data
Jan. 26, 2017 (EP) .................... 17153365

(51) Int. Cl.
  *B64D 11/00*   (2006.01)
  *B64C 1/14*    (2006.01)
  *B64D 11/02*   (2006.01)
  *B64D 11/04*   (2006.01)
  *B64D 11/06*   (2006.01)

(52) U.S. Cl.
  CPC ........ *B64D 11/0023* (2013.01); *B64C 1/1423* (2013.01); *B64D 11/00* (2013.01); *B64D 11/003* (2013.01); *B64D 11/02* (2013.01); *B64D 11/04* (2013.01); *B64D 11/0693* (2013.01); *B64C 2211/00* (2013.01); *B64D 11/0601* (2014.12)

(58) Field of Classification Search
  CPC ..... B64D 11/0023; B64D 11/00; B64D 11/02; B64D 11/003; B64D 11/04; B64D 11/0693; B64D 11/0601; B64D 11/0602; B64D 11/0691; B64C 1/1423; B64C 2211/00; B64C 1/1469
  See application file for complete search history.

(56) References Cited

U.S. PATENT DOCUMENTS 6,079,669 A  *  6/2000  Hanay ................... B64D 11/02
                                                244/118.5
6,474,599 B1 * 11/2002  Stomski ................ B64C 1/1469
                                                244/118.5
(Continued)

FOREIGN PATENT DOCUMENTS

WO    2013124008 A1    8/2013

*Primary Examiner* — Medhat Badawi
*Assistant Examiner* — Vicente Rodriguez
(74) *Attorney, Agent, or Firm* — Lerner, David, Littenberg, Krumholz & Mentlik, LLP (57) ABSTRACT

An interior space for an aircraft includes a cockpit, a cockpit wall separating the cockpit from the remaining interior space, a cabin door arranged directly behind the cockpit wall for accessing the interior space of the aircraft from outside the fuselage, a modular installation space for installation equipment, a plurality of seat rows, a longitudinal aisle extending along the interior space through the seat rows to separate adjacent groups of seats from each other, and an access path for the cabin door. The access path extends from the cabin door to the longitudinal aisle to create an intersection region between the access path and the longitudinal aisle. The modular installation space is arranged directly forward of the seat rows. The access path extends at an angle of at least 100° to the longitudinal aisle in a forward direction.

14 Claims, 4 Drawing Sheets

(56) References Cited

U.S. PATENT DOCUMENTS

| | | | | |
|---|---|---|---|---|
| 7,984,874 | B2* | 7/2011 | Diergardt | B64D 11/00155 |
| | | | | 244/117 R |
| 2003/0066931 | A1* | 4/2003 | Ward | B64D 11/04 |
| | | | | 244/118.5 |
| 2003/0189131 | A1* | 10/2003 | Cloud | B64D 45/0015 |
| | | | | 244/118.5 |
| 2006/0032977 | A1* | 2/2006 | Simmons | B64C 1/1469 |
| | | | | 244/118.5 |
| 2006/0169840 | A1* | 8/2006 | French | B64C 1/1469 |
| | | | | 244/118.5 |
| 2007/0102579 | A1* | 5/2007 | Krieglsteiner | B64D 11/00 |
| | | | | 244/129.1 |
| 2010/0288881 | A1* | 11/2010 | Helfrich | B64C 1/1469 |
| | | | | 244/118.6 |
| 2012/0048998 | A1* | 3/2012 | Schliwa | B64D 11/02 |
| | | | | 244/118.6 |
| 2014/0355282 | A1* | 12/2014 | Cuddy | B64D 47/02 |
| | | | | 362/471 |
| 2017/0106983 | A1* | 4/2017 | Castanos | B64D 11/0691 |

* cited by examiner

FORWARD INTERIOR SPACE ARRANGEMENT FOR AN AIRCRAFT

CROSS-REFERENCE TO PRIORITY APPLICATION

This application claims the benefit of, and priority to, European patent application number EP 17153365.6, filed Jan. 26, 2017. The content of the referenced application is incorporated by reference herein.

TECHNICAL FIELD

Embodiments of the subject matter described herein relate generally a forward interior space arrangement for an aircraft and an aircraft having such an arrangement.

BACKGROUND

For some aircraft operators it is a desire to increase the passenger capacity inside an aircraft cabin substantially without reducing the individual passenger comfort. It is known to achieve this by decreasing the installation space requirements for on-board lavatories, while the equipment of these is cleverly arranged inside the lavatory housing to maintain a full functionality, on the one hand, and to meet all relevant regulations and without a user feeling cramped, on the other hand.

Particularly for short and medium range aircraft it is an option to reduce galley capacity, if meals are served only optionally or on demand. Installation space at an aft or center galley position may be freed to install additional passenger seats or additional stowage volume.

For example, European patent document EP 2 817 221 A1 shows a toilet module for a vehicle, comprising a front wall, a first functional wall and a second functional wall as well as a toilet unit, which is arranged at the first functional wall opposite the front wall. The second functional wall extends between the first functional wall and the front wall and is perpendicular to the front wall. The toilet unit has a longitudinal extension axis, which forms an angle which is greater than 0° with the second functional wall in order to provide a particularly narrow and compact toilet module.

BRIEF SUMMARY

It is an object of the disclosure to provide an alternative arrangement inside an aircraft cabin for still further increasing the number of passenger seats and/or stowage volume offered in the aircraft cabin, without reducing the individual passenger comfort.

This object is solved by a forward interior space arrangement for an aircraft having the features of independent claim 1. Advantageous embodiments and further improvements may be gathered from the sub-claims and the following description.

A forward interior space arrangement for an aircraft according to the disclosure comprises a cockpit arranged at a forward most part of an interior space in a fuselage of the aircraft, a cockpit wall for separating the cockpit from a remaining part of the interior space, at least one forward cabin door, which is arranged directly behind the cockpit wall for accessing the interior space of the aircraft from outside the fuselage, at least one first modular installation space for installation equipment, a plurality of first seat rows, at least one longitudinal aisle extending along the interior space through the first seat rows and thereby separating adjacent groups of seats from each other and an access path for each of the at least one cabin door, extending from the respective cabin door to at least one of the at least one longitudinal aisle, thereby creating an intersection region between the respective access path and the respective longitudinal aisle. The at least one first modular installation space is arranged directly forward of one of the first seat rows and the at least one access path extends at an angle of at least 100° to the at least one longitudinal aisle in a forward direction.

The arrangement according to the disclosure focuses on a forward interior space of an aircraft, which includes a cockpit, the cabin doors at a forward most part, at least a part of seat rows as well and the region between the cockpit and the seat rows in general. The cockpit may include common equipment required for controlling the aircraft and is not important for the core of the disclosure. The cockpit, which is separated from a remaining part of the interior space by the cockpit wall, constitutes the forward most installation in the interior of the aircraft. The passenger cabin is arranged directly behind the cockpit wall, i.e. starting from the cockpit wall and extending into a rearward direction. The cabin may preferably comprise an elongate extension. The cockpit and the cabin are integrated into a fuselage of the aircraft, which may have a substantially cone-shaped rear end, a cylindrical main portion and a tapered front, which extends from the cylindrical main portion to a nose.

The at least one forward cabin door is movably supported on the fuselage to selectively cover or open an access opening. According to the disclosure it is desired to arrange the at least one forward cabin door at a most forward position as possible, leading to a position directly behind the cockpit wall. Commonly, forward cabin doors are arranged at a further rearward position, thereby leaving a space sufficient for installation of a galley or stowage compartments that include a short corridor to the cockpit. Commonly used access paths for reaching a cabin aisle are usually arranged perpendicular to the longitudinal axis and parallel to the lateral axis. Such a setup provides a sufficient assistance space for crew members required during the boarding.

The angular orientation of the access path from the at least one cabin door to the longitudinal aisle inside the passenger cabin allows to maintain a sufficient assistance space just behind the cockpit wall, depending on the actual setup of the arrangement according to the disclosure, without requiring a galley module as commonly used. Further, an entry point of a longitudinal aisle may remain on the same position as in common aircraft cabins, due to the angular access paths.

By providing an access path that extends at an angle of at least 100° to the at least one longitudinal aisle in a forward direction, passengers who enter the interior space of the aircraft do not reach the respective longitudinal aisle from a perpendicular direction but they have to walk in a slightly rearward direction as well as a lateral direction depending on the angle between the access path and the longitudinal aisle. Hence, an "entry point" for reaching the at least one longitudinal aisle is moved to a slightly further rearward position from the respective cabin door.

The angle between the at least one access path and the at least one longitudinal aisle may be larger than 100° and may reach up to 110°, 120°, 130° or even 140°, depending on the type of aircraft, into which the arrangement is to be incorporated.

Due to shifting the ends of the respective access path in a longitudinal direction, an additional triangular or trapezoidal space between the respective access path and a lateral axis of the cabin intersecting with the above-mentioned "entry point" is created. This additional space may be occupied by additional groups of seats or other equipment. Consequently, by displacing one of the lateral ends of an access path in a longitudinal direction, additional seats are installable into the cabin.

On the other hand, a space between the respective access path and the cockpit wall has at least one delimiting edge, which is not exactly perpendicular to the longitudinal axis. Consequently, it is possible to install equipment into the space between the cockpit wall and the at least one access path that is also triangular or trapezoidal. However, this allows to gain space for at least a niche, a corridor into the cockpit or similar, in which access control means, a working space for crew members or the such may be integrated. Flight preparation in the cockpit is also less disturbed by passengers entering the cabin through such a configuration.

Consequently, the arrangement according to the disclosure allows to increase the number of passenger seats and/or stowage volume.

In an advantageous embodiment, the at least one first modular installation space extends in a substantially lateral direction less than a subsequent group of first seats. Hereby, a region directly adjacent the at least one longitudinal aisle, i.e. at an inner end of the first modular installation space, provides a free space for walking between one of the at least one cabin door and the at least one aisle. This may particularly be useful in arrangements with a non-symmetric setup, where there is one first installation space created at one cabin door and another first installation space created at an opposite cabin door, wherein one of the first installation spaces comprises a much larger installation than the other one. An example for such a setup is shown further below.

It is advantageous if at least one of the at least one first modular installation space comprises at least a second group of seats having less seats than a first group of seats directly rearward of the first modular installation space. Such a second group of seats may have an outer lateral delimitation, which is at a more inward position than of the first group of seats behind it, in order to conform a tapered shape of the fuselage in the forward position. The resulting lateral shift between the outer lateral delimitations of both subsequent groups of seats may be equal to or less than the width of the seats, about which the second group of seats is reduced. In the latter case, in which the inner lateral delimitation of the first modular installation space is further outboard than the inner delimitation of the directly subsequent first group of seats, a lateral shift at the inner lateral delimitations is created. The above-mentioned entry point of the at least one longitudinal aisle may therefore be moved to a region adjacent to the first modular installation space. This also implies that the first installation space may be placed at such a forward position in the cabin, which is impossible with common layouts.

Furthermore, at least one of the at least one first modular installation space may comprise at least a first group of seats. The first group of seats may be provided alone or in combination with above-mentioned second group of seats. Hence, the first modular installation space may be rather large in size, depending on the position of the at least one cabin door.

In another advantageous embodiment, the at least one first modular installation space comprises a stowage module. The stowage module may comprise at least one stowage compartment intended for temporarily holding an object, e.g. during flight. The stowage compartment is preferably closable through a covering or closing element/feature or the items to be stowed in the stowage compartment may be holdable or lockable through a holding or locking element/device inside the stowage compartment. The stowage module may be accessible from at least one direction, depending on the size and design of the stowage module as well as the general setup of the arrangement according to the disclosure. The stowage module may be accessible from an adjacent access path, an adjacent longitudinal aisle or a region between a group of first seats and the first modular installation space. The stowage module may be a monument, which may comprise a single sort of or multiple sorts of stowage compartments. This may include a stowage compartment for personal baggage items for passengers or crew members, a stowage compartment for emergency equipment or demo material, but may also relate to trolley parking spaces or still further compartments.

The at least one first modular installation space may also comprise a monument, in particular a galley module. Such a galley module may have rather large dimensional extensions and hence may fill out more than just a space equal to a second or first group of seats. A galley module may include several different equipment items, such as so-called standard units for stowing galley-related objects, electrical appliances, trolley parking spaces and other. In case two cabin doors are available, which is most likely the case in commercial aircraft, it is preferable to place such a galley module only at one lateral half of the interior space in the arrangement according to the disclosure. The other lateral half of the interior space instead may comprise a second group of seats, which probably comprises smaller dimensions than the galley module. Hence, an asymmetric use of space in the forward part of the interior space may result, which would allow to slightly shift access paths from both cabin doors to the at least one aisle slightly away from the galley module in order to be slightly asymmetric as well.

Advantageously, the monument may further comprise at least one foldable seat arranged on a forward facing front of the monument. This may allow to provide a resting area particular for crew members in a region of the aircraft, which may be separated from the passenger occupied regions, e.g. through a partition curtain.

As the monument may comprise a particularly large size, the intersection region may be asymmetrically shifted away from the monument. This allows to use the space inside the cabin as efficient as possible and slightly increasing the size of the monument in comparison to e.g. an adjacent group of seats.

It is preferred that the arrangement according to the disclosure further comprises at least one second modular installation space, which is arranged between the cockpit wall and the at least one access path, wherein the at least one second modular installation space extends up to the intersection region. As stated before, due to the angular orientation of the access paths, a trapezoidal or triangular region may be created just rearward of the cockpit wall. This region provides the at least one second modular installation space, which may receive various installation equipment as set forth below. Since the second modular installation space is arranged directly behind the cockpit wall, a cockpit access may be provided therein.

For example, the at least one second modular installation space may comprise at least one lavatory module. A lavatory module may basically comprise a housing that provides a small closable room for personal use. The lavatory module may comprise a toilet, a urinal and/or a washbasin as well as other amenities usually present in an aircraft lavatory. An access from a side of the interior space, which is dedicated for passengers, is preferred. However, additionally or as an alternative, the lavatory module may be accessible from the cockpit. If this is the case, it should be taken care of preventing an access from the passenger cabin through the lavatory module into the cockpit.

Still further, the at least one lavatory module may comprise a lavatory door facing to the at least one longitudinal aisle. The lavatory module therefore is directly accessible from the aircraft cabin and the majority of passengers have the lavatory door in their field of view when approaching the forward part of the cabin, such that an easy accessibility can be ensured.

Due to this prominent position of the lavatory door it is advantageous if a cabin attendant seat is arranged on the lavatory door. The cabin attendant seat may be a common cabin attendant seat, which is commonly arranged on a monument wall, a pedestal or other objects. The cabin attendant seat may comprise a swiveling mounted seating surface as well as a backrest, which may fixedly be mounted on the lavatory door. Since the lavatory and hence the lavatory door is only usable during cruise flight of the aircraft and since a cabin attendant seat is required for all other flight phases, the integration of the cabin attendant seat on the lavatory door does not impede any function in the cabin.

It is preferred that the arrangement comprises two forward cabin doors at two laterally opposite sides of the interior space, such that the at least one longitudinal aisle and the access paths to the at least one longitudinal aisle form a y-aisle arrangement. The advantage of generated free installation space can thereby be achieved at both sides of the aircraft cabin.

In an advantageous embodiment the arrangement may further comprise at least one partition curtain extendable between a position in or at a rear end of the first installation space to a position forward of the at least one first modular installation space at least partially along the longitudinal aisle. This may, for example, separate a crew rest region from passenger occupied regions or may prevent a direct view onto a lavatory door from the front passenger seats.

The disclosure also relates to an aircraft, comprising a fuselage having a front end and a rear end, and a forward interior space arrangement according to the above description.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

Other characteristics, advantages and potential applications of the present disclosure result from the following description of the exemplary embodiments illustrated in the figures. In this respect, all described and/or graphically illustrated characteristics also form the object of the disclosure individually and in arbitrary combination regardless of their composition in the individual claims or their references to other claims. Furthermore, identical or similar objects are identified by the same reference symbols in the figures.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

Figure 1:
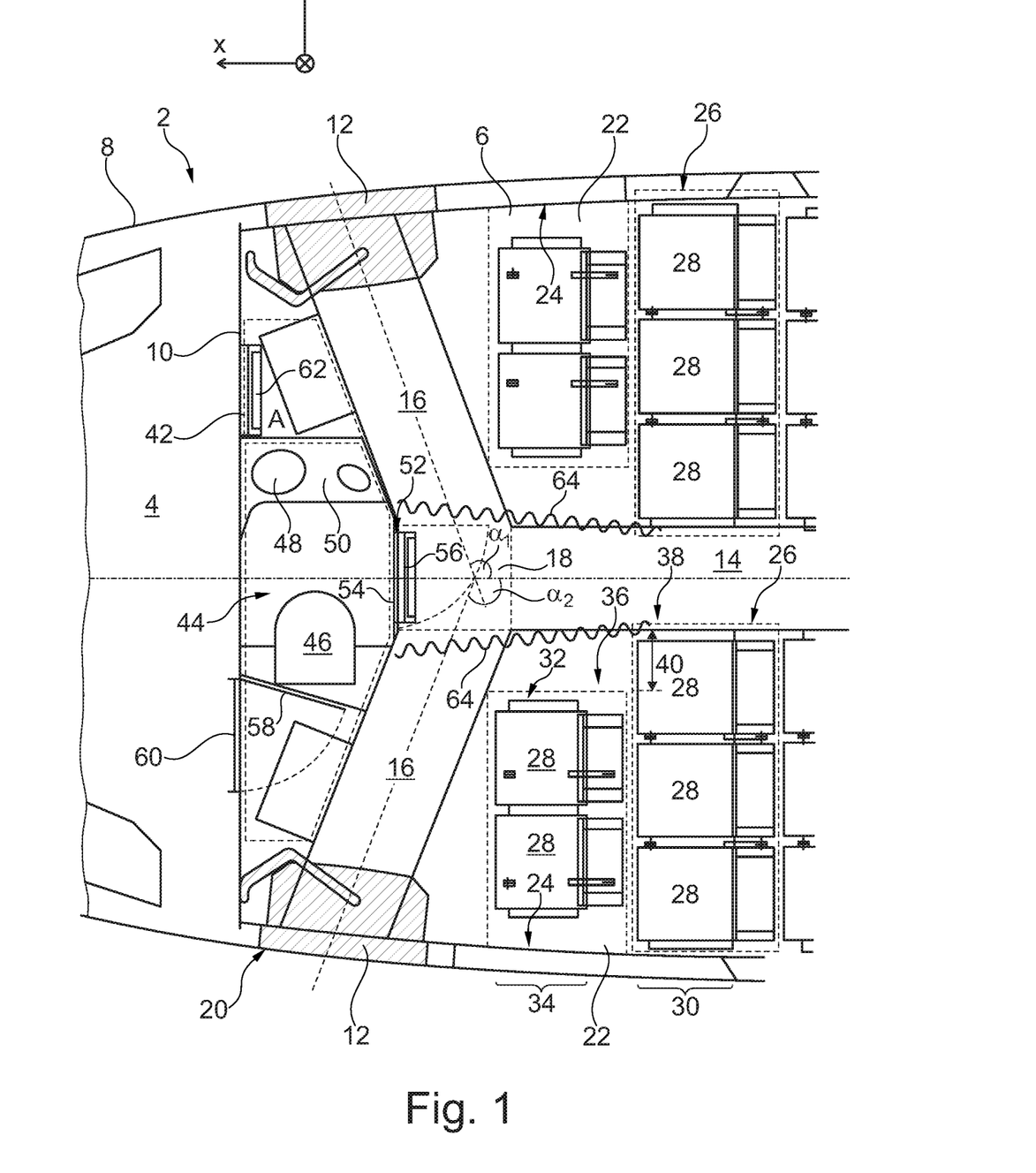
FIG. 1 is an illustration of a first exemplary embodiment of a forward interior space arrangement having two forward cabin doors and additional seats and a lavatory module behind the cockpit wall.

FIG. 1 shows a first exemplary embodiment of a forward interior space arrangement 2 in an aircraft in a top view. First of all, this exemplary embodiment is shown based on a single aisle aircraft, which may comprise a fuselage width of up to or just above 4 m, leading to an economy class layout with six seats abreast. However, this exemplary embodiment shall not be considered as limiting the scope of the disclosure. Other types of aircraft with a more narrow or wider fuselage, that may include a cabin with two longitudinal aisles and eight or more seats abreast, may also be equipped with an arrangement according to the disclosure.

The arrangement 2 comprises a cockpit 4 arranged at a forward-most part of an interior space 6 in a fuselage 8 of the aircraft. The design and equipment of cockpit 4 is not relevant for the disclosure and is therefore not shown in FIG. 1. For separating the cockpit 4 from the remaining part of the interior space 6, a cockpit wall 10 is provided, which basically extends through the whole available width of the interior space 6 in a lateral direction, i.e. along a y-direction of the aircraft.

Directly behind the cockpit wall 10, i.e. from the cockpit wall 10 in a rearward direction, a pair of forward cabin doors 12 at laterally opposite sides of the interior space 6 is shown. They are arranged at a forward-most portion and are positioned as near to the cockpit wall 10 as possible. Both cabin doors are used for boarding or de-boarding the aircraft and are preferably realised as common aircraft doors.

In this example, a single longitudinal aisle 14 is shown, which extends along the longitudinal (x) axis in the interior space 6 from a longitudinal position just behind the cabin doors 12 in a rearward direction. From each cabin door 12, an access path 16 extends to the aisle 14, such that an intersection region 18 between the access paths 16 and the aisle is created. This intersection region may defines a starting place for walking along the aisle 14 and may therefore also referred to as "entry point".

According to the disclosure, the access paths 16 are not arranged perpendicular to the longitudinal aisle 14, i.e. the x-axis of interior space 6, but enclose an angle of at least 100° to the aisle 14 in a forward direction. Said angle is indicated by the reference numerals α1 (right hand side of the interior space 6) and α2 (left hand side of the interior space 6). The angles α1 and α2 are measured over the center lines of the aisle 14 and the access paths 16. In this example, the orientation of both access paths 16 is symmetrical. Hence, α1 and α2 in their illustrated forms are equal.

When entering an opening 20 in the fuselage 8 to reach the aisle 14, a passenger will walk in a slightly rearward direction, i.e. against the forward x-direction. It is hereby possible to provide a first modular installation space 22 at each half of the interior space 6 that extends from an outer lateral delimitation 24 of the interior space 6 in a y-direction towards the aisle 14. Such an installation space 22 may be designed to receive different installation equipment, such as seats as shown in FIG. 1.

Directly rear of the first modular installation spaces 22, first groups 26 of seats 28 are arranged, which are separated by the aisle 14 and constitute first seat rows 30. In this embodiment, six seats 28 are abreast, formed by two first groups 26 of three seats 28 each. As indicated in FIG. 1, a plurality of first seat rows 30 may be arranged in the interior space 6, wherein the number of first seat rows 30 depends on the cabin layout and the fuselage dimensions. Since the fuselage 6 remains substantially cylindrical from the position of the forward most first seat row 30 in a rearward direction, all first seat rows 30 may comprise the same number of seats 28. Other seat pitches, seat widths and arrangements further rear are possible, but are not relevant for the disclosure.

Starting at and in front of the forward-most first seat row 30, the fuselage 8 is tapered, which leads to a continuously decreasing lateral width of the fuselage 8 in the region of the first modular installation space 22 and further forward. While the region of the first modular installation space 22 often remains unused in common arrangements, an embodiment of the invention allows to install two second groups 32 of seats 28 into such an installation space 22 to form a second seat row 34. Due to the slightly forward swept access paths 16, the seats 28 of the second groups 32 do not extend about the same extent in a direction to the centre of the interior space 6 as the first groups 26. Consequently, a lateral inward delimitation 36 of the second group 32 of seats 28 is further outboard than a lateral inward delimitation 38 of a first group 26 of seats 28. This means, that a step 40 in a lateral direction is created.

Due to the angled arrangement of the access paths 16, passengers on the second seat row 34 may comfortably sit even during a boarding or de-boarding phase, since only a lateral inner edge of the modular installation space 22 reaches up to the access paths. Further outboard regions of the first modular installation spaces 22 comprise a sufficiently large distance to the respective access path 16. By shifting the position of the cabin doors 12 to a forward-most position in comparison with common aircraft, a sufficient installation space for ten additional seats (four in a front row and six in a subsequent row) is generated in this example without reducing the individual passenger comfort.

By arranging the access paths 16 in the manner shown, an additional, second modular installation space 42 between the cockpit wall 10 and the access paths 16 as well as the longitudinal aisle 14 or the intersection region 18, respectively, is created. This second modular installation space 42 allows to install a modular setup of equipment, which is exemplarily shown in FIG. 1 as well.

For example, a lavatory module 44 is provided, which is arranged in a central region of the second modular installation space 42 in order to make use of the largest dimensional extension in x-direction. Without limiting the disclosure to this layout, the lavatory module 44 exemplarily comprises a toilet 46 and a washbasin 48 integrated into a shelf 50. The lavatory module 44 may comprise an access opening 52, which faces to the intersection region 18 and is closed by a lavatory door 54.

In the example shown in FIG. 1, additionally a first flight or cabin attendant seat 56 is arranged on the lavatory door 54, as it provides a perfect view into the interior space 6. During start and landing phases the lavatory door 56 remains closed and a flight attendant may sit on the flight attendant seat 56 facing rearwardly. The seat 56 is exemplarily shown to be attached to an outer surface of the door 54, but this is not limiting the disclosure to this type of construction.

For entering the cockpit 4, exemplarily a cockpit door 58 is arranged at the left-hand side of the interior space 6, which cockpit door 58 selectively opens or closes a cockpit opening 60. Of course, several access control mechanisms may be integrated into the door 58 and/or the cockpit opening 60 to prevent unauthorized access.

On the right-hand side of the installation space 42, an additional flight or cabin attendant seat 62 may be positioned directly at the cockpit wall 10 and directly adjacent to the lavatory module 44. While a flight attendant may sit on this flight attendant seat 62 during start and landing phases, this place may also be used for resting during cruise flight.

For separating the aisle 14 from the right-hand side or the left-hand side of the interior space 6, partition curtains 64 are present and may selectively be brought into the illustrated positions. For example, these may be used for improving the individual passenger comfort by selectively preventing a direct view onto the lavatory door 54 during certain operation phases of the aircraft. Furthermore, the curtains 64 at least optically separate passengers lining up in front of the lavatory module 44 from passengers in the seat rows 30 and 34.

Figure 2:
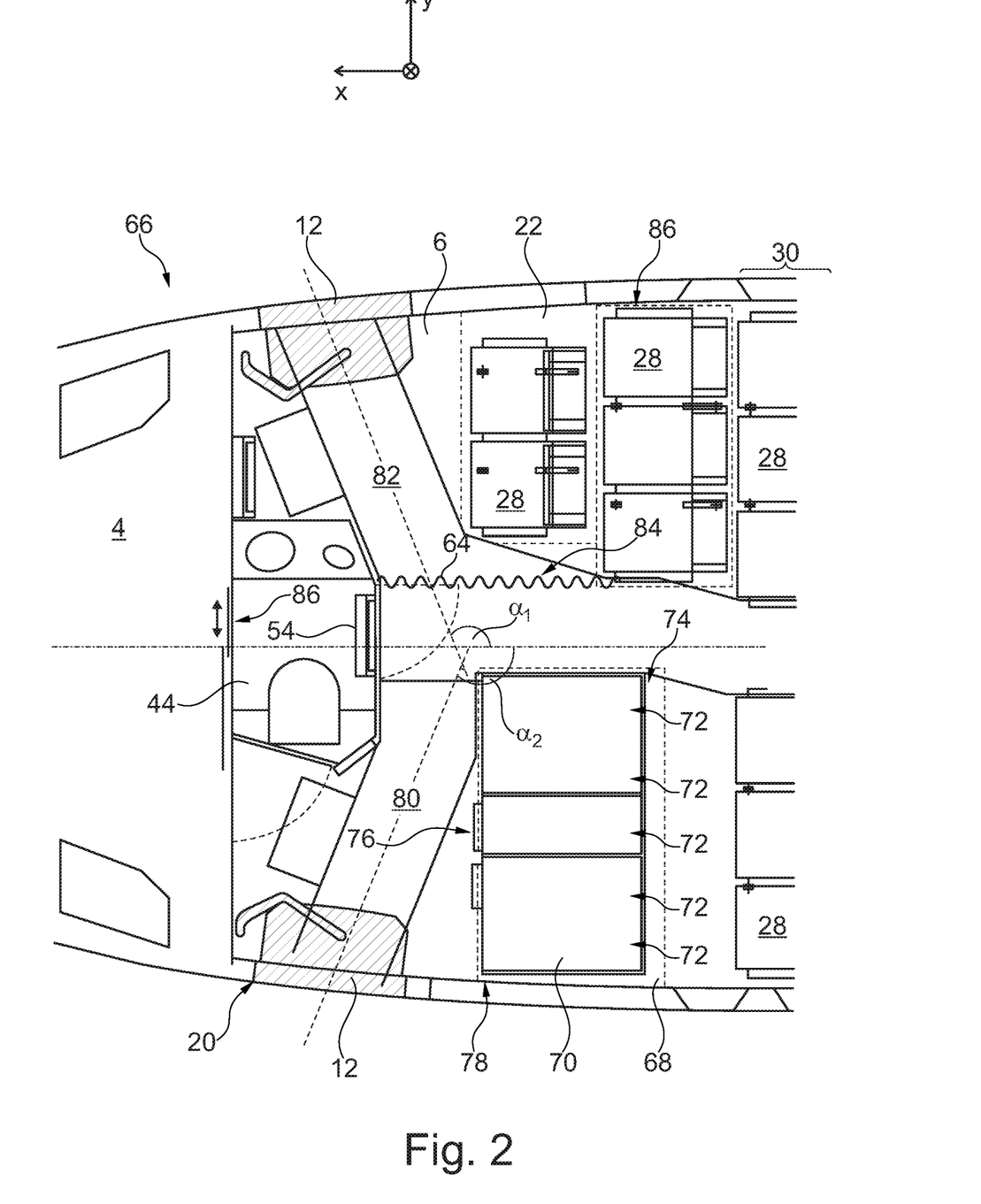
FIG. 2 is an illustration of a second exemplary embodiment of a forward interior space arrangement having two forward cabin doors, additional seats, an additional galley module and a lavatory module behind the cockpit wall.

FIG. 2 shows another exemplary embodiment of an arrangement 66 as a top view. This exemplary embodiment basically differs from the arrangement 2 shown in FIG. 1 only in some details. A major difference lies in the creation of a first modular installation space 68 at the left-hand side of the interior space 6, which extends over a length of two seat rows. The first modular installation space 68 comprises a galley module 70, which exemplarily comprises a number of trolley parking spaces 72, which may reach from a forward facing front 78 up to a rearward directed face 74 and, above these, electrical appliances may be arranged accessible from the front 78. Further, foldable seats 76, which may also be referred to as tip up seats 76, may be arranged at the front 78. Hence, the region between the front 78 and the cockpit wall 10 may be used as a crew rest area.

The extension of access paths 80 and 82 slightly differs from the access paths 16 of FIG. 1 in that an intersection region 84 is shifted more into the right-hand side of the interior space 6. For this purpose, a third group of passenger seats 86 may be present, which includes three passenger seats 28, which comprise a slightly smaller width than of a first seat row 30 behind.

The lavatory module 44, which may be equal to the lavatory module 44 in FIG. 1, additionally comprises a sliding door 86 for allowing crew members from cockpit 4 to enter the lavatory module 44. It is conceivable that the lavatory door 54 comprises an access control mechanism preventing a passage of a passenger through lavatory module 44 and the sliding door 86 into the cockpit 4. Further, a cabin attendant seat 56 is arranged on the lavatory door 54. In the example shown in FIG. 2, the seat 56 is exemplarily shown to be integrated into the door 54, but this is not limiting the disclosure to this type of construction and the installation positions may be changed to the one shown in FIG. 1.

Figure 3:
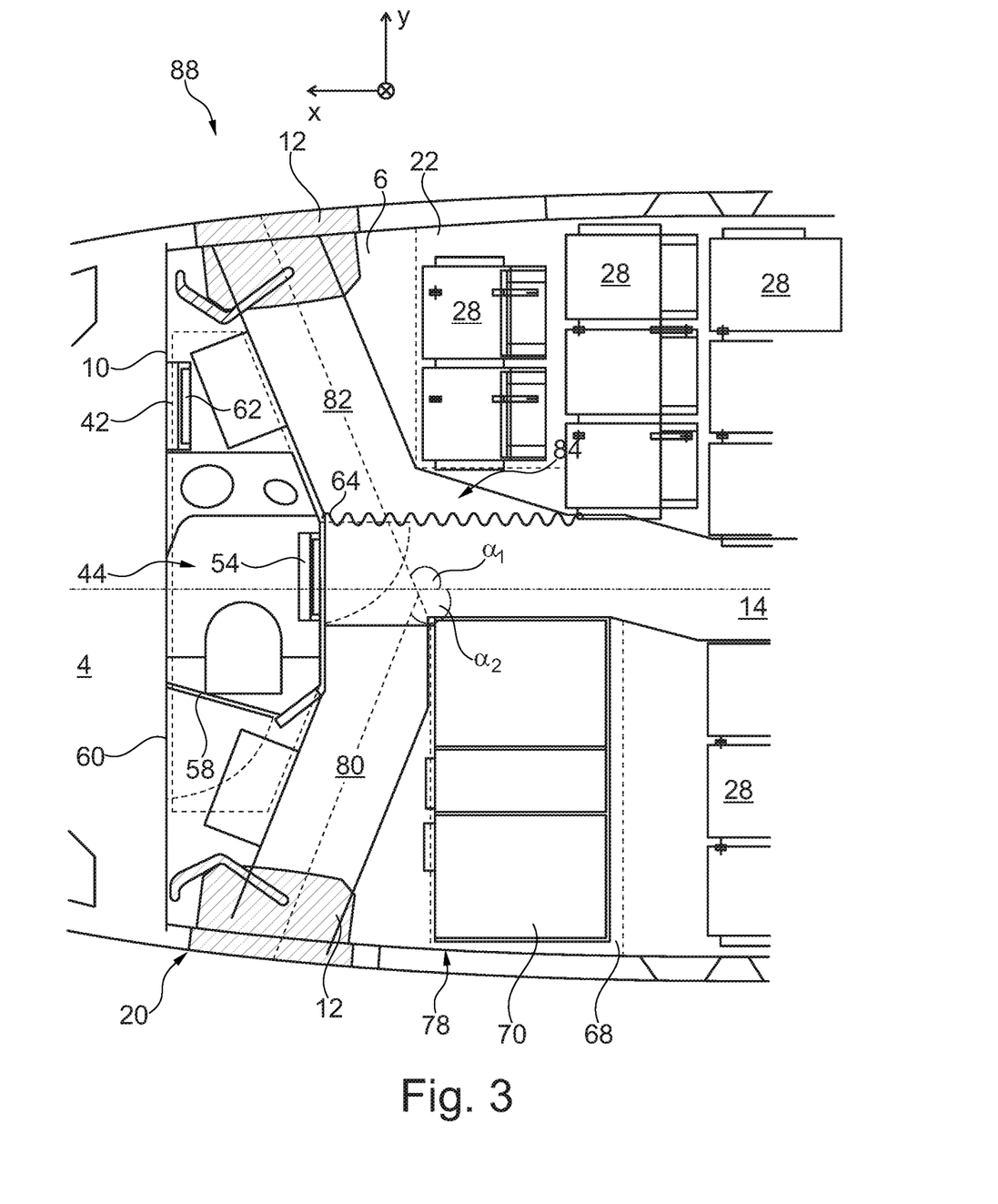
FIG. 3 is an illustration of a third exemplary embodiment of a forward interior space arrangement.

FIG. 3 shows another exemplary embodiment of an arrangement 88, which is a modified arrangement 66 of FIG. 2. A difference lies in the modified access to the cockpit 4, which is similar to the arrangement in FIG. 1.

Figure 4:
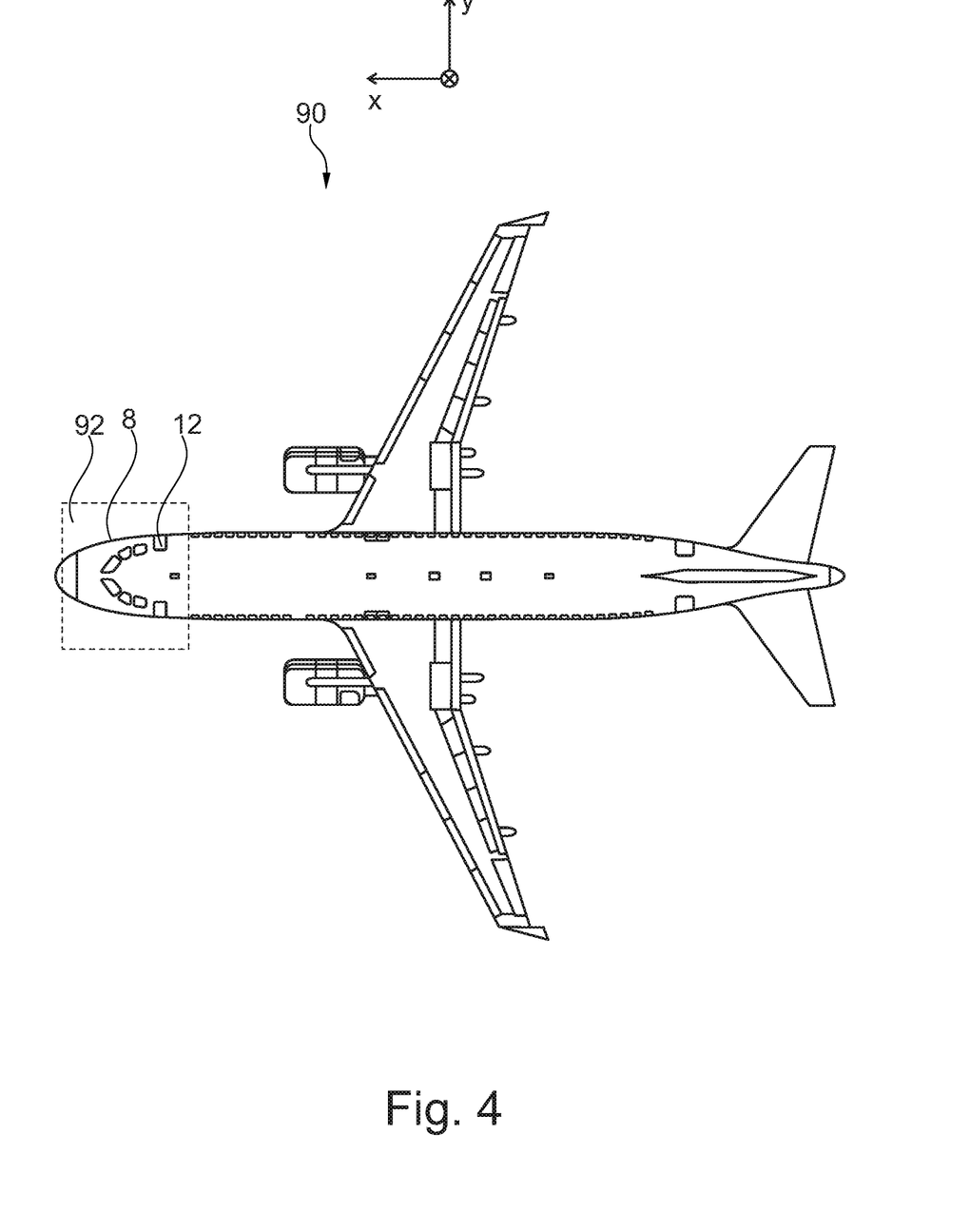
FIG. 4 is a top view of an aircraft.

FIG. 4 shows an aircraft 90 having a fuselage 8 as well as an arrangement 92, which may be comparable to the arrangements 2, 66 and 88 illustrated above.

In addition, it should be pointed out that "comprising" does not exclude other elements or steps, and "a" or "an" does not exclude a plural number. Furthermore, it should be pointed out that characteristics or steps which have been described with reference to one of the above exemplary embodiments may also be used in combination with other characteristics or steps of other exemplary embodiments described above. Reference characters in the claims are not to be interpreted as limitations.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A forward interior space arrangement for an aircraft, comprising:
   a cockpit arranged at a forward-most part of an interior space in a fuselage of the aircraft;
   a cockpit wall for separating the cockpit from a remaining part of the interior space;
   at least one forward cabin door, which is arranged abutting the cockpit wall for accessing the interior space of the aircraft from outside the fuselage;
   at least one first modular installation space for receiving installation equipment;
   a plurality of first seat rows;
   at least one longitudinal aisle extending along the interior space through the first seat rows and thereby separating adjacent groups of seats from each other;
   an access path for each of the at least one cabin door, extending from the respective cabin door to at least one of the at least one longitudinal aisle, thereby creating an intersection region between the respective access path and the respective longitudinal aisle; and
   at least one second modular installation space between the cockpit wall and the at least one access path, wherein the at least one second modular installation space extends up to the intersection region,
   wherein the at least one first modular installation space is arranged directly forward of one of the first seat rows and behind the at least one forward cabin door;
   wherein the at least one access path defines an angle of at least 100° with the at least one longitudinal aisle in a forward direction in the intersection region, and
   wherein the at least one second module installation space is arranged along the at least one longitudinal aisle.

2. The arrangement of claim 1, wherein the at least one first modular installation space extends in a substantially lateral direction less than a subsequent first group of seats.

3. The arrangement of claim 1, wherein at least one of the at least one first modular installation space comprises at least a second group of seats having less seats than a first group of seats directly rearward of the first modular installation space.

4. The arrangement of claim 1, wherein at least one of the at least one first modular installation space comprises at least an additional first group of seats.

5. The arrangement of claim 1, wherein the at least one first modular installation space comprises a stowage module.

6. The arrangement of claim 1, wherein the at least one first modular installation space comprises a galley module.

7. The arrangement of claim 6, further comprising at least one foldable seat arranged on a forward facing front of the galley module.

8. The arrangement of claim 6, wherein the intersection region is asymmetrically shifted away from the galley monument.

9. The arrangement of claim 1, wherein the at least one second modular installation space comprises at least one lavatory module.

10. The arrangement of claim 9, wherein the at least one lavatory module comprises a lavatory door facing to the at least one longitudinal aisle.

11. The arrangement of claim 10, wherein a cabin attendant seat is arranged on the lavatory door.

12. The arrangement of claim 1, wherein the at least one cabin door comprises two forward cabin doors at two laterally opposite sides of the interior space, such that the at least one longitudinal aisle and the access paths to the at least one longitudinal aisle form a Y-shaped aisle arrangement.

13. The arrangement of claim 1, further comprising at least one partition curtain extendable between a position in or at a rear end of the first installation space to a position forward of the at least one first modular installation space at least partially along the longitudinal aisle.

14. An aircraft comprising:
   a fuselage having a front end and a rear end; and
   a forward interior space arrangement in the fuselage, the forward interior space comprising:
      a cockpit arranged at a forward-most part of an interior space in a fuselage of the aircraft;
      a cockpit wall for separating the cockpit from a remaining part of the interior space;
      at least one forward cabin door, which is arranged abutting the cockpit wall for accessing the interior space of the aircraft from outside the fuselage;
      at least one first modular installation space for receiving installation equipment;
      a plurality of first seat rows;
      at least one longitudinal aisle extending along the interior space through the first seat rows and thereby separating adjacent groups of seats from each other;
      an access path for each of the at least one cabin door, extending from the respective cabin door to at least one of the at least one longitudinal aisle, thereby creating an intersection region between the respective access path and the respective longitudinal aisle, wherein the intersection region defines a starting point of the at least one longitudinal aisle; and
      at least one second modular installation space between the cockpit wall and the at least one access path, wherein the at least one second modular installation space extends up to the intersection region,
      wherein the at least one first modular installation space is arranged directly forward of one of the first seat rows;
      wherein the at least one access path defines an angle of at least 100° with the at least one longitudinal aisle in a forward direction in the intersection region, and wherein the at least one second module installation space is arranged along the at least one longitudinal aisle.

* * * * *